United States Patent
Dukes (10) Patent No.: US 7,740,211 B2
(45) Date of Patent: Jun. 22, 2010

(54) CONDUIT ATTACHMENT APPARATUS

(75) Inventor: Joseph Allen Dukes, Sugar Hill, GA (US)

(73) Assignee: Panduit Corp., Tinley Park, IL (US)

(*) Notice: Subject to any disclaimer, the term of this patent is extended or adjusted under 35 U.S.C. 154(b) by 1006 days.

(21) Appl. No.: 11/420,503

(22) Filed: May 26, 2006

(65) Prior Publication Data

US 2007/0017687 A1 Jan. 25, 2007

Related U.S. Application Data

(60) Provisional application No. 60/685,196, filed on May 27, 2005.

(51) Int. Cl.
*F16L 3/08* (2006.01)

(52) U.S. Cl. .................. 248/74.4; 248/74.1; 24/285

(58) Field of Classification Search ............. 248/75–78, 248/74.1, 74.2, 74.4, 72, 49, 62, 63, 65, 68.1; 24/279, 285
See application file for complete search history.

(56) References Cited

U.S. PATENT DOCUMENTS

| | | | | |
|---|---|---|---|---|
| 953,707 | A * | 4/1910 | Pearce | 248/59 |
| 3,547,386 | A * | 12/1970 | Clarke et al. | 248/63 |
| 3,889,909 | A * | 6/1975 | Koscik | 248/56 |
| 5,391,837 | A | 2/1995 | Caveney | |
| 5,634,619 | A | 6/1997 | Alessi | |
| 6,013,875 | A | 1/2000 | Fridenberg et al. | |
| 6,034,329 | A | 3/2000 | Kawamura | |
| 6,135,398 | A | 10/2000 | Quesnel | |
| 6,352,224 | B1 | 3/2002 | Collins | |
| 6,448,495 | B1 | 9/2002 | Mattei et al. | |
| 6,536,719 | B2 | 3/2003 | Rivera | |
| 6,580,029 | B1 | 6/2003 | Bing | |
| 6,666,415 | B2 | 12/2003 | Hansen | |
| 6,712,320 | B2 | 3/2004 | Rivera | |
| 6,732,987 | B2 * | 5/2004 | Wooten et al. | 248/229.1 |
| 6,756,539 | B1 | 6/2004 | VanderVelde | |
| 6,924,432 | B1 * | 8/2005 | Connors | 174/660 |

FOREIGN PATENT DOCUMENTS

| | | |
|---|---|---|
| EP | 0272370 B1 | 1/1990 |
| WO | 9403749 A1 | 2/1994 |

OTHER PUBLICATIONS

Bejed, Inc. Cable Spillway Brochure, 1 page, date unknown.

* cited by examiner

*Primary Examiner*—Gwendolyn Baxter
(74) *Attorney, Agent, or Firm*—Robert A. McCann; Christopher S. Clancy; Aimee E. McVady (57) ABSTRACT

A conduit attachment apparatus is secured to an open end of a conduit for holding cables or wires. In one embodiment the conduit attachment apparatus comprises a spillway and a securement collar. The spillway is adapted to provide bend radius control to cables or wires extending out of the conduit. The securement collar is adapted to secure and remove the spillway from the conduit. In another embodiment, the securement collar can be installed without the use of tools and can rotate up to approximately 180° about the spillway.

15 Claims, 6 Drawing Sheets

CONDUIT ATTACHMENT APPARATUS

CROSS-REFERENCE TO RELATED APPLICATION

This application claims priority to U.S. Provisional Application No. 60/685,196, filed May 27, 2005, the entirety of which is incorporated herein by reference.

FIELD OF INVENTION

This invention relates to conduits for holding cables and, more particularly to conduit attachments adapted to be secured to such conduits.

BACKGROUND

The building industry uses a number of flexible members, such as cables, wires and flexible tubes, for providing utilities and services to a building. For example, wires and cables, including inner-duct and fiber optic cables, are used to bring electricity, television, telephone, data, Internet and other well-known services into a building or other known location. These buildings can include residential, commercial and industrial structures.

To protect the cables and wires, as well as the workmen who service these buildings, conduits for holding the cables and wires are provided. The conduits are typically open at one end and positioned many feet off the ground (e.g., in the ceiling). Often, cables and wires exit from the opening of the conduit and extend away from the conduit in an angular or downward direction relative to the conduit. As a result, these cables and wires extend or hang over the edge of the opening of the conduit. This arrangement can lead to damage to the cables and wires, particularly if the edge of the conduit is sharp or lacking in bend radius control.

There is a need, therefore, for a conduit attachment that provides bend radius control to cables and wires positioned at and extending from an open end of a conduit. Given that conduits are often positioned in elevated positions relative to the ground or floor, there is also a need for a conduit attachment that is easy to install and remove.

SUMMARY OF THE INVENTION

The conduit attachment of the present invention may be secured to an open end of a conduit for holding cables. The conduit attachment may comprise a securement device and a spillway. The securement device is adapted to secure the spillway to the conduit. The spillway helps provide bend radius control for cables extending out of the conduit.

In one embodiment, the conduit attachment apparatus of the present invention comprises a securement device releasably securable to a conduit carrying a plurality of cables that pass from the conduit to a position outside the conduit, a spillway integrally formed with the securement device and a hinge about which the securement device rotates. The securement device comprises a top portion and a bottom portion defining an opening therebetween. The spillway supports the plurality of cables extending from the conduit. The hinge may comprise a pin positioned within a groove. In certain embodiments, the hinge provides up to about 180° rotation of the top portion relative to the bottom portion.

In another embodiment, the conduit attachment apparatus comprises a securement device releasably securable about a conduit and comprising a top portion and a bottom portion defining an opening therebetween for receiving a plurality of cables passing from the conduit to a position outside the conduit, a spillway for carrying the plurality of cables, and a locking mechanism adapted to releasably engage the top portion to one of the bottom portion and the spillway without the use of tools (i.e. in this embodiment, no installation tools, such as screwdrivers or pliers, are necessary). The spillway of this embodiment is integrally formed with the securement device and generally aligned with a longitudinal axis thereof. The locking mechanism may comprise interlocking projections. The locking mechanism may also comprise a locking member and an aperture comprising complementary threaded portions, with the aperture positioned on at least one of the spillway and the bottom portion.

In still another embodiment, the conduit attachment apparatus comprises a securement device releasably securable about a conduit carrying a plurality of cables that pass from the conduit to a position outside tile conduit and a spillway integrally formed with the securement device comprising a first end and a second end with a curved surface positioned therebetween for carrying the plurality of cables. The securement device comprises a top portion and a bottom portion defining an opening therebetween. One of the top and bottom portions comprises a retainer and a locking member positioned within the retainer. The locking member may comprise at least one of a captive screw, toggle screw and a projection. The locking member may also comprise a knurled head. In certain embodiments, the locking member is adapted to remain secured to the retainer when the securement device is in an open state.

The foregoing embodiments may comprise various modifications and additional features. The securement device may, for example, comprise a collar formed by top and bottom curvilinear portions. In some cases, the top and bottom portions may exhibit complementary geometric shapes. In other cases, the bottom portion and the spillway are integrally formed. Additionally, the spillway may comprise two or more slots adapted to receive a strap for securing the plurality of cables to the spillway and the apparatus may comprise a latch connecting the top portion and the spillway.

DETAILED DESCRIPTION

Figure 1:
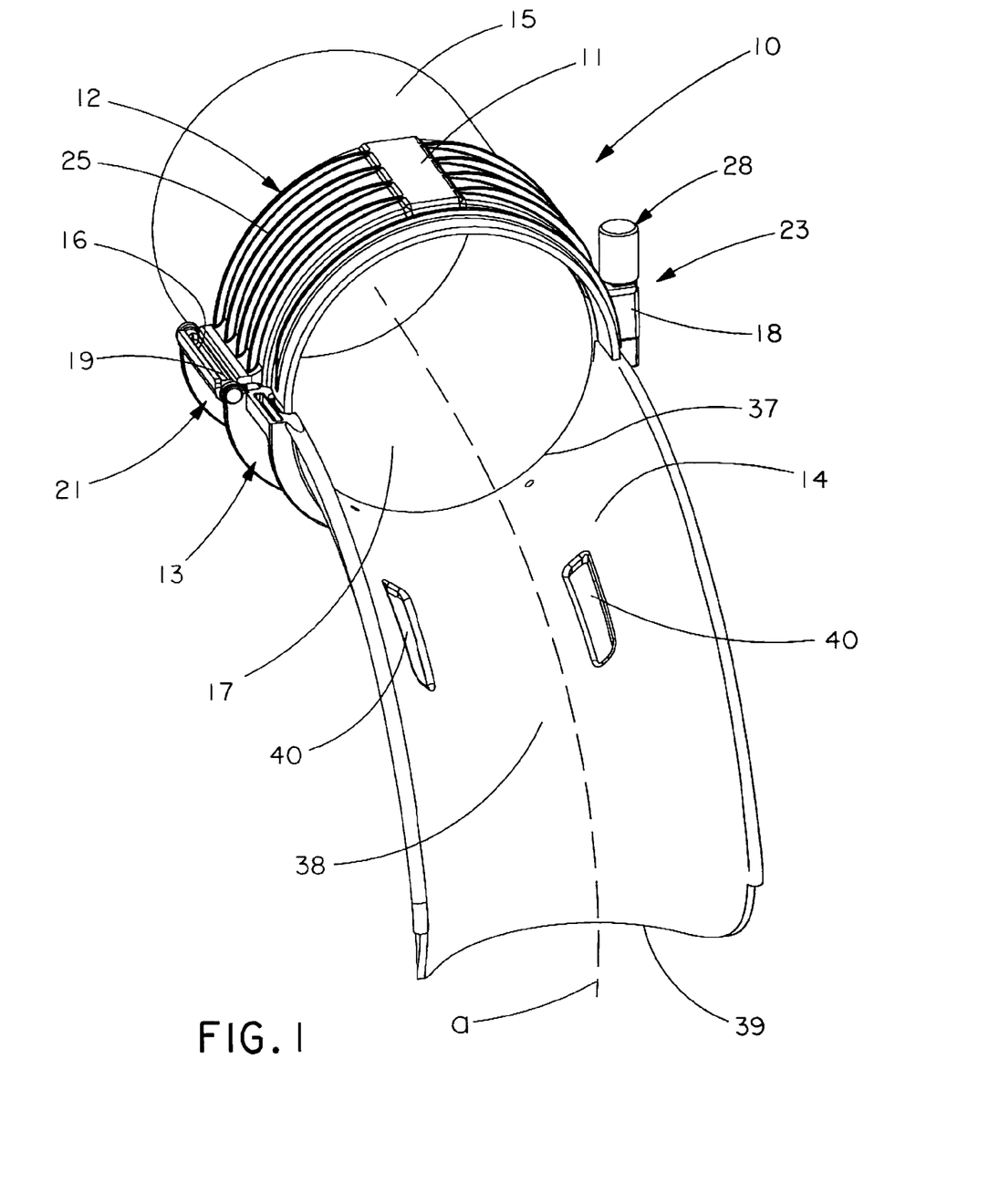
FIG. 1 is a left front perspective view of one embodiment of the conduit attachment of the present invention in position on a conduit for holding cables.
Figure 2A:
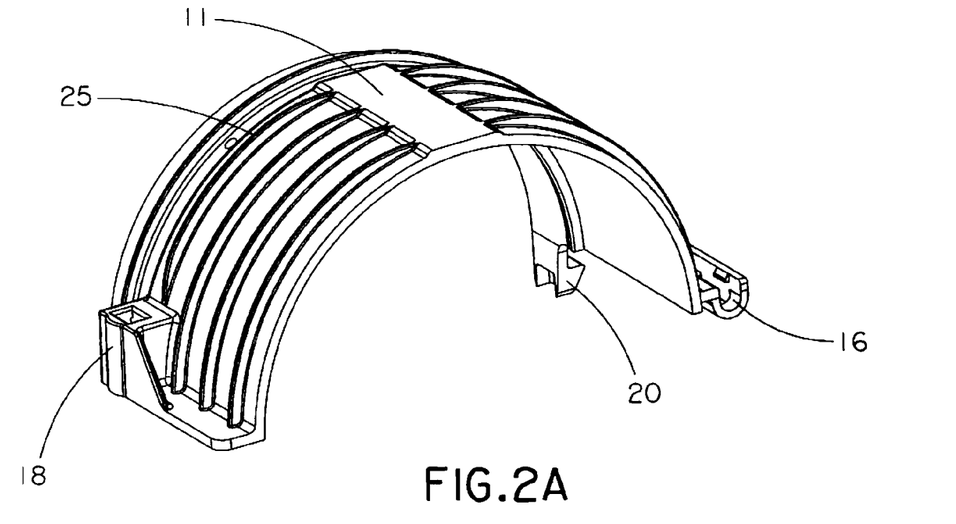
FIG. 2A is a left rear perspective view of one embodiment of the securement collar of the present invention.
Figure 2B:
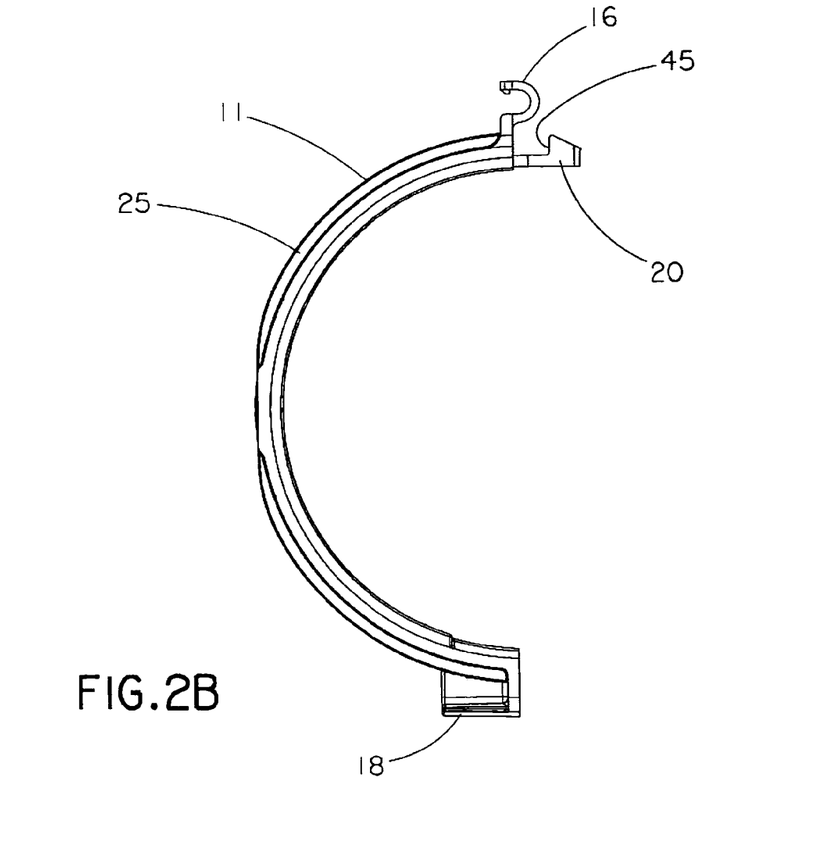
FIG. 2B is an end elevational view of the securement collar of FIG. 2A.

Referring now to FIG. 1 one embodiment of the conduit attachment 10 of the present invention is shown. Conduit attachment 10 includes securement device 12 and spillway 14. Conduit attachment 10 is adapted to be removably secured to conduit 15 carrying a plurality of cables that pass from conduit 15 to a position outside conduit 15. Removable securement of conduit attachment 10 to conduit 15 may take place without the use of tools.

Figure 7:
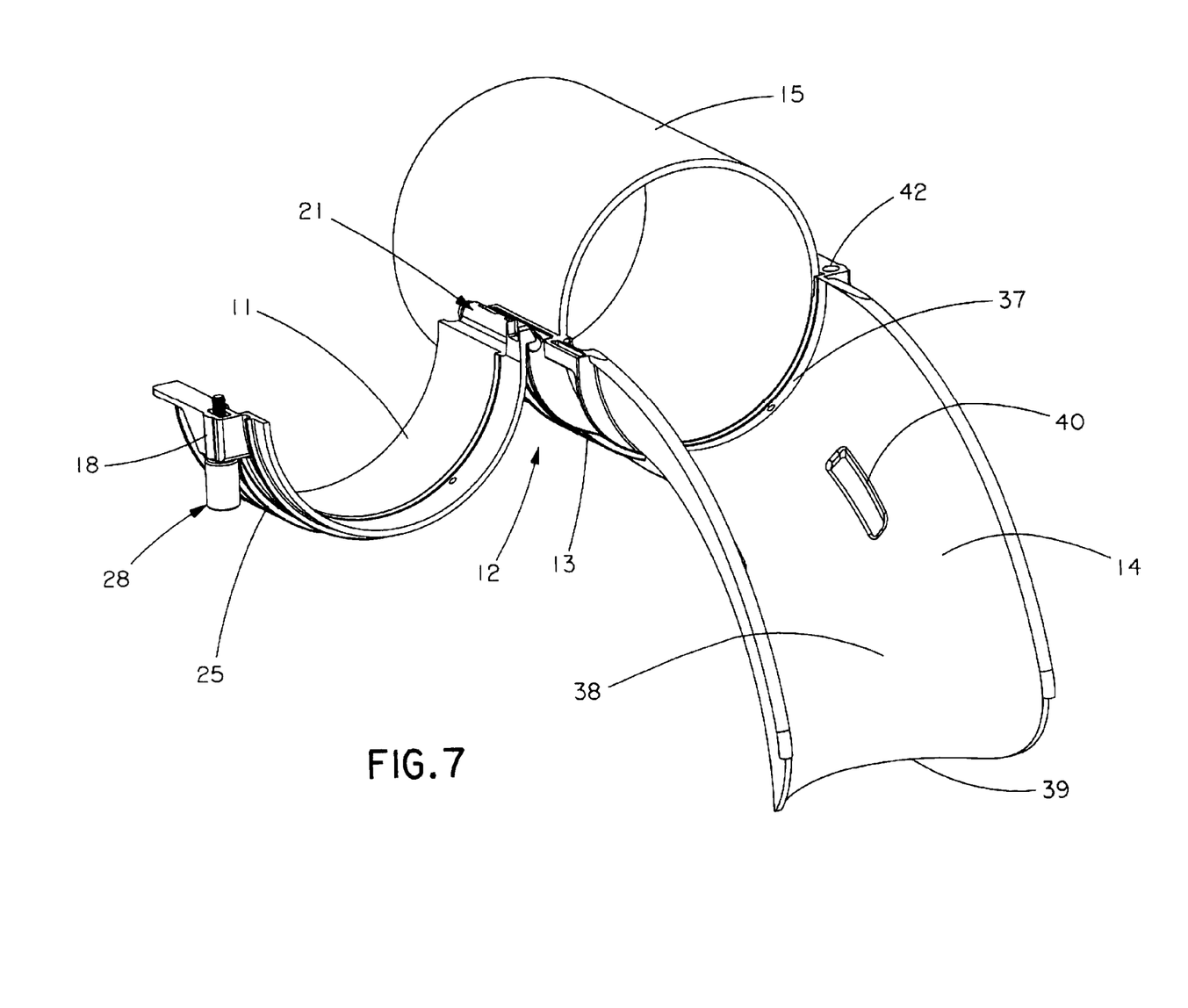
FIG. 7 is a left front perspective view of the conduit attachment of FIG. 1 being positioned onto the conduit.

Securement device 12 may comprise top and bottom curvilinear portions 11 and 13, defining central opening 17 therebetween. Top and bottom portions 11 and 13 may exhibit complementary geometric shapes, and have ribs 25 on an outer surface thereof. As shown in FIGS. 1 and 7, securement device 12 may take the form of a collar. Securement device 12 may further comprise groove 16, retainer 18 and catch or hook 20. Groove 16 is adapted to receive pin 19 to create hinge 21, about which securement device 12 can rotate and open.

As shown in FIGS. 1 and 7, locking mechanism 23 may be utilized to releasably engage top portion 11 to at least one of bottom portion 13 and spillway 14. In one embodiment, locking mechanism 23 comprises retainer 18, locking member 28 and threaded aperture 42. Retainer 18 is typically positioned on one of top and bottom portions 11 and 13 and is adapted to receive and hold locking member 28. Retainer 18 can also help prevent locking member 28 from falling out of securement device 12 when top portion 11 is in an open position, as shown in FIG. 7.

Figure 3:
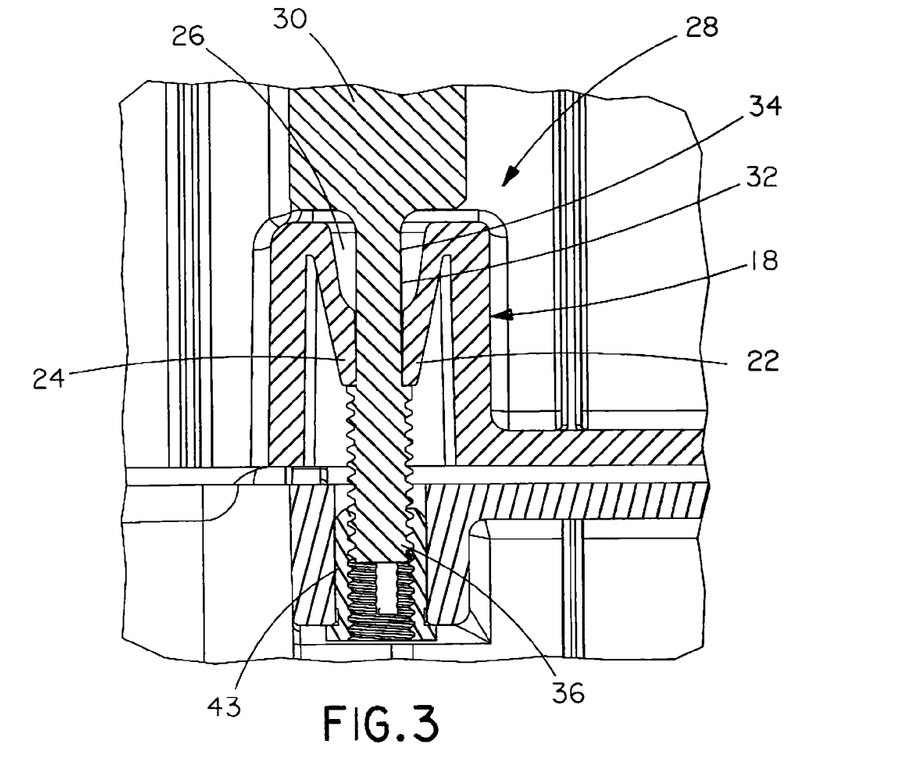
FIG. 3 is an enlarged cross-sectional view of the retainer mechanism of FIG. 1.

Retainer 18, shown in more detail in FIG. 3, may include flexible opposing tabs 22 and 24. Although FIG. 3 only shows one set of opposing tabs 22 and 24, two sets of opposing tabs (i.e. four tabs total) are typically positioned on opposite sides of retainer 18. Opposing tabs 22 and 24 may comprise flexible plastic members or other suitable material that is resilient and will flex under application of sufficient force. Opening 26, positioned between tabs 22 and 24, is adapted to receive locking member 28.

Various types of locking members 28 may be employed. In one embodiment, shown in FIGS. 3 and 4, locking member 28 comprises a captive screw held in place by retainer 18. Other structures, such as a toggle screw or interlocking projections are, however, suitable. Releasable engagement of top portion 11 to bottom portion 13 of securement device 12 through engagement of locking member 28 to threaded aperture 42 is described hereinbelow.

Figure 4:
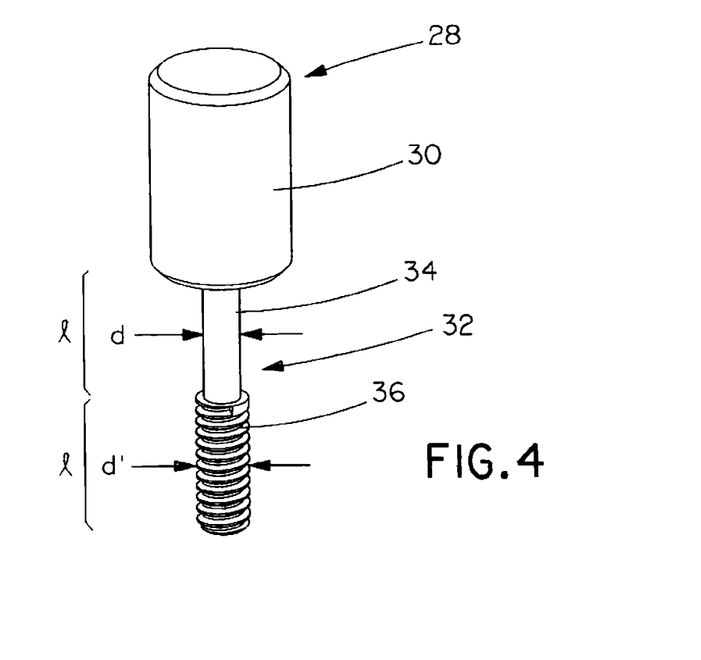
FIG. 4 is an enlarged top perspective view of the securement member of FIG. 1.

Referring now to FIG. 4, locking member 28 may comprise knurled head 30 and shaft 32. Knurled head 39 facilitates installation by making it easier for users to grip locking member 23. Shaft 32 includes top portion 34 and bottom portion 36. Top portion 34 may be smooth and typically includes diameter d between about 0.100 inches and about 0.160 inches, with about 0.130 inches being moat common. Bottom portion 36 may be threaded and includes diameter d', which typically is larger than that of diameter d of top portion 34. Diameter d' of bottom portion 36 may be between about 0.153 inches and 0218 inches, with about 0.188 being most common. Length l of each of top and bottom portions 34 and 36 may be between about 0.40 inches and 0.60 inches, respectively.

Figure 5:
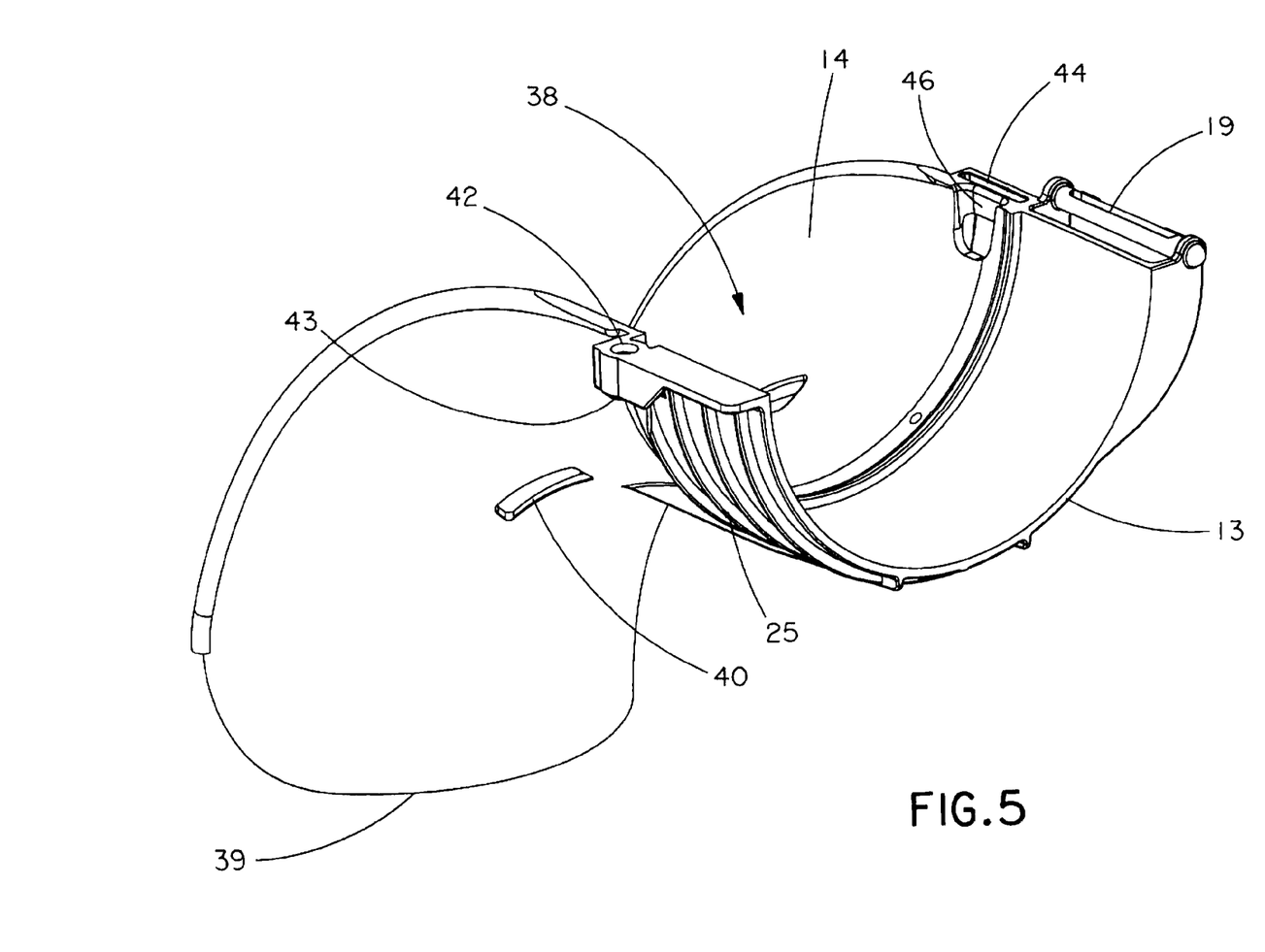
FIG. 5 is a left rear perspective view of one embodiment of the spillway of the present invention.
Figure 6:
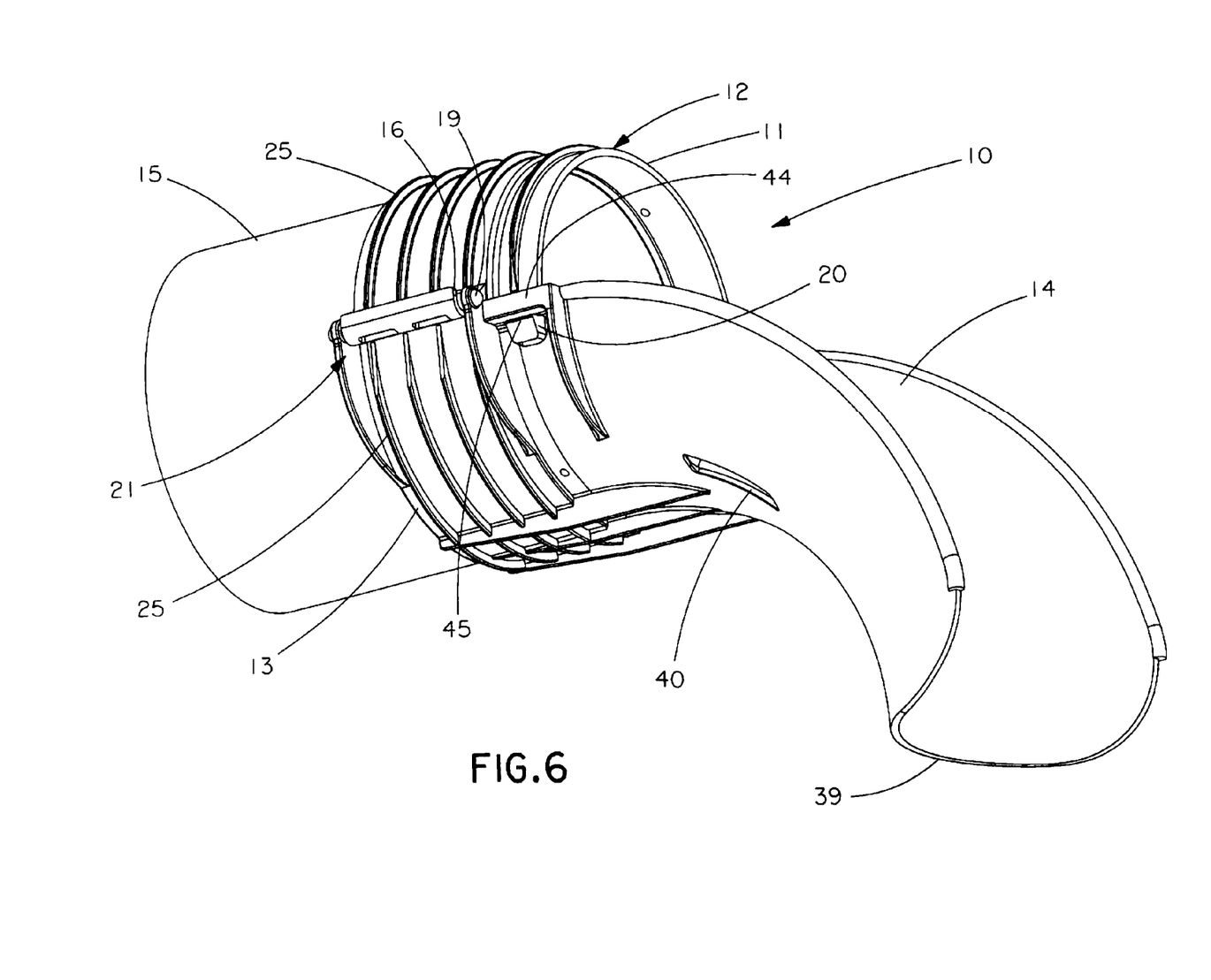
FIG. 6 is a right front perspective view of a second embodiment of the conduit attachment of the present invention in position on a conduit for holding cables.

Spillway 14, as used herein, means any device or structure for supporting cables extending from a conduit and providing bend radius control for the cables. As shown in FIGS. 1, 5 and 6, spillway 14 comprises first end 37 and second end 39, with curved surface 38 positioned therebetween for supporting a plurality of cables extending from conduit 15 through central opening 17. Spillway 14 may be connected to securement device 12 and aligned with a longitudinal axis α thereof. More particularly, spillway 34 may be integrally formed with bottom portion 33 of device securement 12, shown in FIG. 5. With continuing reference to FIG. 5, bottom portion 33 may include pin 19 and threaded aperture 42, while spillway 14 may include at least one slot 40 and projection or bar member 44. The positioning of these components may, of course, vary, with aperture 42 having an insert 43 that is positioned on spillway 14 for example. Curved surface 38 provides bend radius control to avoid damaging cables that extend into spillway 14 from conduit 15. Pin 19 mates with groove 16 on securement device 12 to create hinge 21. Slot 40 receives strap(s) (not shown) that surround cables or wires to secure them within spillway 14. Threaded aperture 42 has an insert 43 that is adapted to receive complementary threaded bottom portion 36 of locking member 28. Insert 43 may be a threaded, press-in "Pem" style insert. With threaded bottom portion 36 threadingly secured into insert 43 of threaded aperture 42, securement device 12 secures conduit attachment 10 to conduit 15, as shown in FIGS. 1 and 6.

In another embodiment of the present invention, shown in FIG. 6, a latch arrangement provides additional support to hinge 21. Latch comprises catch or hook 20 and bar member 44, which defines an opening or slot 46 with a sidewall of spillway 14. In the process of placing pin 19 into groove 16 to form hinge 21, catch or hook 20 is positioned through slot 46 and upper portion 45 of hook 20 engages bar member 44. With collar 12 in a closed position over conduit 15, upper portion 45 is positioned under bar member 44. As securement device 12 is moved to an open position, as seen in FIG. 7, at least some of the weight of securement device 12 is transferred through catch or hook 20 and onto a top portion of bar member 44.

Securement device 12 and spillway 14 may be made from plastic or a similar flexible material by injection molding, while locking member 28 may be made from brass by machining. Other materials and manufacturing methods known to those of skill in the art may also be employed. After manufacture, the foregoing components may be assembled and removably secured to conduit 15, as in FIGS. 1, 6 and 7.

Top portion 11 of securement device 12 is typically attached to spillway 14 first. In no particular order, pin 19 is snapped into groove 16 to create hinge 21, which, in some embodiments, may be reinforced by engaging catch 20 with bar member 44. Locking member 28 is pushed through opening 26 between opposing tabs of 22 and 24 of retainer 18 by application of sufficient downward force on locking member 28 to bend tabs 22 and 24, thereby allowing bottom portion 36 of shaft 32 to pass through tabs 22 and 24 into an enlarged opening 26 created by the larger diameter d' of lower portion 36. Under these circumstances, tabs 22 and 24 flex toward a downwardly angled position, permitted by the relatively smaller diameter d of top portion 34 of locking member 28, as shown in FIG. 3. Since the diameter d' of lower portion 36 is greater than opening 26, an interference fit is created between bottom portion 36 and tabs 22 and 24. This interference fit allows locking member 28 to remain within retainer 18 when securement device 12 is positioned in an open state, as seen in FIG. 7.

Once conduit attachment 10 has been assembled, it may be removably secured to conduit 15. With securement device 12 in its open position (FIG. 7), first end 37 of spillway 14 is placed under an open end of conduit 15. Advantageously, hinge 21 provides up to about 180° rotation of top portion 11 of securement device 12 relative to bottom portion 13. Once conduit attachment 10 is in position, top portion 11 is rotated over conduit 15 and locking member 28 is inserted into threaded aperture 42. To help ensure that conduit attachment 10 is secured to conduit 15, knurled head 30 of locking member 28 is turned by a user to engage threaded bottom portion 36 with insert 43 of threaded aperture 42. Installation tools, such as screwdrivers or pliers, are not necessary for this embodiment. The interference fit created between bottom portion 36 of locking member 28 and tabs 22 and 24 of retainer 18 further retains locking member 28 in retainer 18 when collar is in a closed position, as shown in FIGS. 1 and 6.

Securement device 12 can also be opened away from conduit 15 by threadingly disengaging bottom portion 36 of locking member 28 from insert 43 of threaded aperture 42 and disengaging catch 20 from bar member 44. As previously mentioned, this arrangement permits 180° rotation for securement device 12 about conduit 15.

Conduit attachment 10 may be utilized in new construction, before or after cables are in place, or in retrofit applications, after cables are in position. In either case, cables extending out from conduit 15 may be laid over spillway 14 and held in place with straps that slide through slots 40.

Variations, modifications and other implementations of what is described herein will occur to those of ordinary skill in the art without departing from the spirit and scope of the invention. Accordingly, the invention is in no way limited by the preceding illustrative description.

The invention claimed is:

1. A conduit attachment apparatus comprising:
   a securement device releasably securable to a conduit carrying a plurality of cables that pass from the conduit to a position outside the conduit, the securement device comprising a top portion and a bottom portion defining an opening therebetween;
   a spillway integrally formed with the securement device, wherein the spillway having a downwardly curved surface for maintaining a minimum bend radius for the plurality of cables extending from the conduit through the opening and along the spillway;
   a hinge about which the top portion of the securement device rotates; and
   a latch connecting the top portion and the spillway, wherein the latch comprises a hook positionable with a slot.

2. The conduit attachment apparatus of claim 1, wherein the securement device comprises a collar formed by the top and bottom portions and wherein the top and bottom portions are curvilinear.

3. The conduit attachment apparatus of claim 1, wherein the securement device is releasably securable to the conduit without the use of tools.

4. The conduit attachment apparatus of claim 1, wherein the hinge comprises a pin positioned within a groove.

5. The conduit attachment apparatus of claim 1, wherein the hinge provides up to about 180° rotation of the top portion relative to the bottom portion.

6. The conduit attachment apparatus of claim 1, wherein the spillway comprises two or more slots adapted to receive a strap for securing the plurality of cables to the spillway.

7. A conduit attachment apparatus comprising:
   a securement device releasably securable about a conduit the securement device comprising a top portion and a bottom portion defining an opening therebetween for receiving a plurality of cables passing from the conduit to a position outside the conduit;
   a spillway for carrying the plurality of cables, the spillway integrally formed with the securement device and generally aligned with a longitudinal axis thereof, wherein the spillway having a downwardly curved surface for maintaining a minimum bend radius for the plurality of cables passing along the spillway;
   wherein the spillway comprises two or more slots adapted to receive a strap for securing the plurality of cables to the spillway; and
   a locking mechanism adapted to releasably engage the top portion to at least one of the bottom portion and the spillway without the use of tools.

8. The conduit attachment apparatus of claim 7, wherein the securement device comprises a collar formed by the top and bottom portions and wherein the top and bottom portions are curvilinear.

9. The conduit attachment apparatus of claim 7, wherein the locking mechanism comprises interlocking projections.

10. The conduit attachment apparatus of claim 7, wherein the locking mechanism comprises a locking member and a retainer, the locking member releasably engaged within the retainer.

11. The conduit attachment apparatus of claim 10, wherein the locking member comprises at least one of a captive screw, toggle screw and a projection.

12. The conduit attachment apparatus of claim 10, wherein the locking member and an aperture positioned on at least one of the spillway and the bottom portion comprise complementary threaded portions.

13. The conduit attachment apparatus of claim 10, wherein the locking member comprises a knurled head.

14. The conduit attachment apparatus of claim 7, wherein the top portion of the securement device is adapted to rotate up to about 180° relative to the bottom portion.

15. A conduit attachment apparatus comprising:
   a securement device releasably securable to a conduit carrying a plurality of cables that pass from the conduit to a position outside the conduit, the securement device comprising a top portion and a bottom portion defining an opening therebetween;
   a spillway integrally formed with the securement device, wherein the spillway having a downwardly curved surface for maintaining a minimum bend radius for the plurality of cables extending from the conduit through the opening and along the spillway;
   wherein the spillway comprises two or more slots adapted to receive a strap for securing the plurality of cables to the spillway; and
   a hinge about which the top portion of the securement device rotates.

* * * * *

UNITED STATES PATENT AND TRADEMARK OFFICE
CERTIFICATE OF CORRECTION

| | |
|---|---|
| PATENT NO. | : 7,740,211 B2 |
| APPLICATION NO. | : 11/420503 |
| DATED | : June 22, 2010 |
| INVENTOR(S) | : Joseph Allen Dukes |

It is certified that error appears in the above-identified patent and that said Letters Patent is hereby corrected as shown below:

Column 3, line 43 which reads "knurled head 30 and shaft 32. Knurled head 39 facilitates" should read "knurled head 30 and shaft 32. Knurled head 30 facilitates"

Column 3, line 45 which reads "member 23. Shaft 32 includes top portion 34 and bottom portion" should read "member 28. Shaft 32 includes top portion 34 and bottom portion"

Column 3, line 48 which reads "inches, which about 0.130 inches being moat common" should read "inches, which about 0.130 inches being most common"

Column 3, lines 51-52 which reads "Diameter d' of bottom portion 36 may be between about 0.153 inches and 0218 inches, with about 0.188 being most" should read "Diameter d' of bottom portion 36 may be between about 0.158 inches and 0.218 inches, with about 0.188 being most"

Column 3, lines 64-66 which reads "More particularly, spillway 34 may be integrally formed with bottom portion 33 of device securement 12, shown in Fig. 5. With continuing reference to FIG. 5, bottom portion 33 may" should read "More particularly, spillway 14 may be integrally formed with bottom portion 13 of device securement 12, as shown in Fig. 5. With continuing reference to FIG. 5, bottom portion 13 may"

Signed and Sealed this
Seventeenth Day of January, 2012

David J. Kappos
*Director of the United States Patent and Trademark Office*